(12) United States Patent
Uchida et al.

(10) Patent No.: US 11,993,920 B2
(45) Date of Patent: May 28, 2024

(54) WORK MACHINE CONTROL SYSTEM

(71) Applicant: KOMATSU LTD., Tokyo (JP)

(72) Inventors: Naoki Uchida, Tokyo (JP); Ryota Enomoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 439 days.

(21) Appl. No.: 17/421,765

(22) PCT Filed: Nov. 19, 2019

(86) PCT No.: PCT/JP2019/045234
§ 371 (c)(1),
(2) Date: Jul. 9, 2021

(87) PCT Pub. No.: WO2020/166158
PCT Pub. Date: Aug. 20, 2020

(65) Prior Publication Data
US 2022/0090357 A1     Mar. 24, 2022

(30) Foreign Application Priority Data

Feb. 15, 2019 (JP) .................................. 2019-025877

(51) Int. Cl.
*F16H 59/04* (2006.01)
*E02F 9/20* (2006.01)
(Continued)

(52) U.S. Cl.
CPC .......... *E02F 9/2079* (2013.01); *E02F 9/2004* (2013.01); *F16H 59/04* (2013.01); *F16H 61/02* (2013.01)

(58) Field of Classification Search
CPC .......... F16H 59/04; F16H 59/44; F16H 47/04; F16H 61/02; E02F 9/0841; E02F 9/2004;
(Continued)

(56) References Cited

U.S. PATENT DOCUMENTS 8,868,306 B1   10/2014  Shiina et al.
2007/0111851 A1  5/2007  Fukasawa et al.
(Continued)

FOREIGN PATENT DOCUMENTS

CN   1890490 A    1/2007
CN   101184938 A  5/2008
(Continued)

*Primary Examiner* — Tinh Dang
(74) *Attorney, Agent, or Firm* — Faegre Drinker Biddle & Reath LLP (57) ABSTRACT

A work machine control system includes an operational input portion that accepts an input operation to change a position of acceptance, maintains the position of acceptance when there is no input operation accepted, and provides an operation command in accordance with change in position of acceptance, an operational force providing portion that provides a plurality of operational forces in correspondence with an amount of change of the position of acceptance, a transmission portion that changes a speed of rotation provided from a drive source to transmit resultant rotation to a drive wheel, and a controller that controls the transmission portion based on a travel speed of the drive wheel in accordance with the operation command.

10 Claims, 9 Drawing Sheets

(51) Int. Cl.
*E02F 9/22* (2006.01)
*F16H 61/02* (2006.01)

(58) Field of Classification Search
CPC ..... E02F 9/2079; E02F 9/2012; E02F 9/2253; H01H 19/11; H01H 3/50; B60Y 2200/415; G05G 1/08; G05G 5/065; G05G 5/03

See application file for complete search history.

(56) References Cited

U.S. PATENT DOCUMENTS

| | | | |
|---|---|---|---|
| 2009/0105028 A1 | 4/2009 | Hiraki et al. | |
| 2011/0202243 A1 | 8/2011 | Ishibashi et al. | |
| 2012/0199371 A1 | 8/2012 | Sakai et al. | |
| 2013/0136624 A1 | 5/2013 | Kitao et al. | |
| 2014/0214273 A1 | 7/2014 | Smith et al. | |
| 2016/0334008 A1* | 11/2016 | Park | F16H 59/044 |
| 2019/0163225 A1* | 5/2019 | Saito | G05G 1/01 |

FOREIGN PATENT DOCUMENTS

| | | | |
|---|---|---|---|
| CN | 102245940 A | 11/2011 | |
| CN | 102575594 A | 7/2012 | |
| CN | 104412010 A | 3/2015 | |
| JP | 2000-099178 A | 4/2000 | |
| JP | 2005-344835 A | 12/2005 | |
| JP | 2006-220285 A | 8/2006 | |
| JP | 2008-082124 A | 4/2008 | |
| JP | 2008-144942 A | 6/2008 | |
| JP | 2011-188781 A | 9/2011 | |
| JP | 2018-047860 A | 3/2018 | |
| JP | 2018-071676 A | 5/2018 | |
| WO | WO-2013068514 A2 * | 5/2013 | ............. B60K 37/06 |

\* cited by examiner

WORK MACHINE CONTROL SYSTEM

TECHNICAL FIELD

The present disclosure relates to a work machine control system.

BACKGROUND ART

An apparatus as below has conventionally been proposed. A dial knob is provided in a console of a vehicle. The dial knob includes a cylindrical knob body. As the knob body is turned, an operational feeling resulting from sliding is obtained (see, for example, Japanese Patent Laying-Open No. 2008-144942 (PTL 1)).

CITATION LIST

Patent Literature

PTL 1: Japanese Patent Laying-Open No. 2008-144942

SUMMARY OF INVENTION

Technical Problem

A wheel loader is demanded to restrict a vehicle speed corresponding to a work. In switching a type of a work, setting of restriction of the vehicle speed is also switched. There is a demand for a wide range where restriction of the vehicle speed is adjusted; for example, the vehicle speed is precisely set on a mud ground, whereas the vehicle speed is not restricted during unloaded travel. On the other hand, there is a demand for ability to set the vehicle speed in small increments or decrements. These demands are desirably satisfied with simple operations.

The present disclosure provides a work machine control system that allows easy setting of a travel speed.

Solution to Problem

According to the present disclosure, a work machine control system includes a base member, an operational input portion operably attached to the base member, the operational input portion accepting an input operation to change a position relative to the base member, the operational input portion maintaining the relative position when there is no input operation accepted, the operational input portion providing an operation command in accordance with the relative position, an operational force providing portion that provides a plurality of different operational forces in correspondence with change of the relative position, a transmission portion that changes a speed of rotation provided from a drive source and transmits resultant rotation to a drive wheel, and a controller that instructs the transmission portion to change the speed of rotation in accordance with the operation command.

Advantageous Effects of Invention

According to the work machine control system in the present disclosure, a plurality of different operational forces in correspondence with change of a position of the base member relative to the operational input portion are provided. Therefore, a travel speed can readily be set.

DESCRIPTION OF EMBODIMENTS

An embodiment will be described below with reference to the drawings. The same elements have the same reference characters allotted in the description below and their labels and functions are also the same. Therefore, detailed description thereof will not be repeated.

[Overall Construction]

In an embodiment, a wheel loader 10 will be described by way of example of a work machine to which a concept of the present disclosure is applicable.

Figure 1:
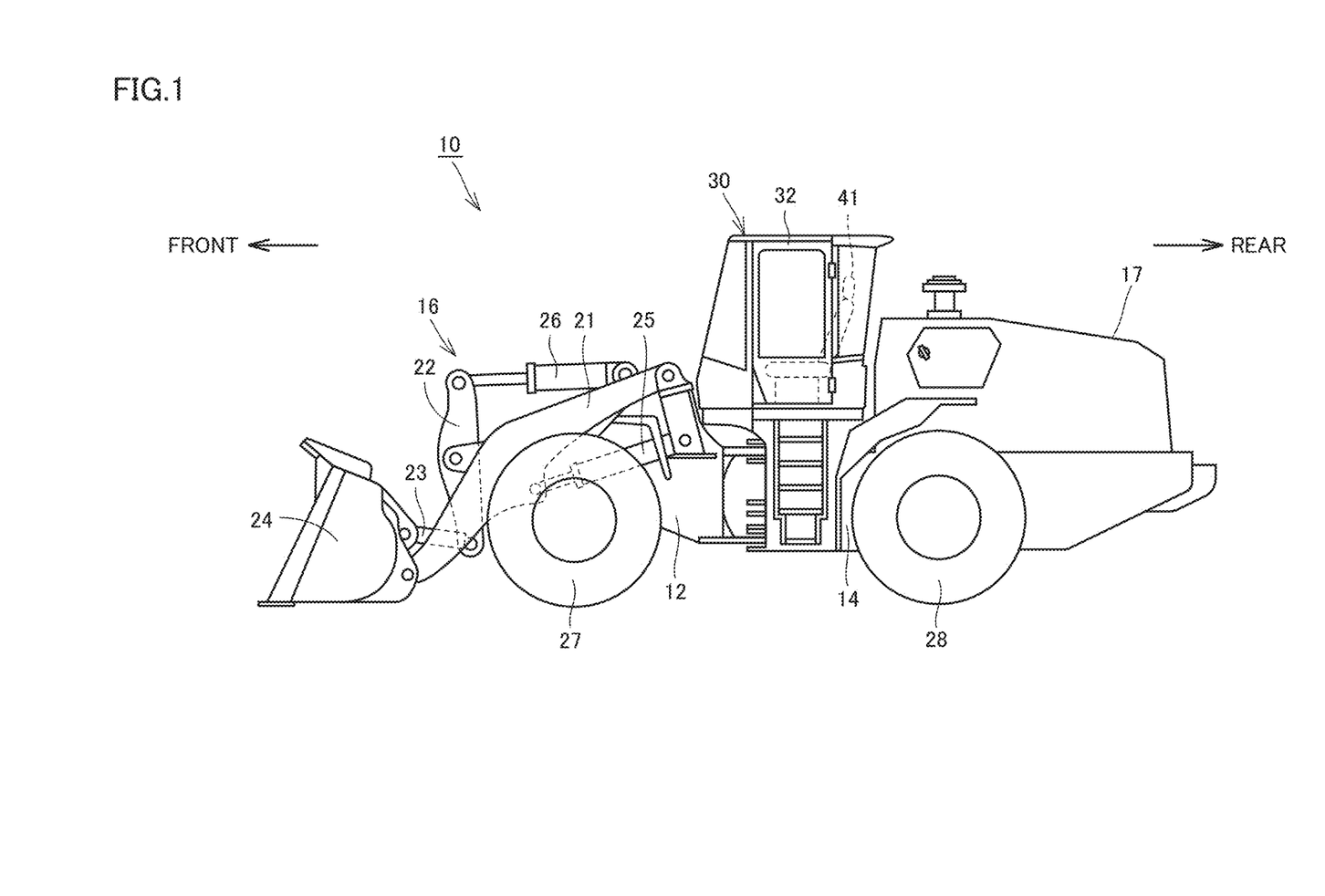
FIG. 1 is a side view showing overview of a construction of a wheel loader 10 based on an embodiment.

FIG. 1 is a side view showing overview of a construction of wheel loader 10 based on the embodiment.

As shown in FIG. 1, wheel loader 10 includes a front frame 12, a rear frame 14, a front wheel 27, a rear wheel 28, a work implement 16, a cab (an operator's cab) 30, an operator's seat 41, and an engine hood 17.

A direction in which wheel loader 10 travels in straight lines is herein referred to as a fore/aft direction of wheel loader 10. In the fore/aft direction of wheel loader 10, a side where work implement 16 is arranged with respect to front frame 12 and rear frame 14 is defined as the fore direction and a direction opposite to the fore direction is defined as the aft direction. A lateral direction of wheel loader 10 is a direction orthogonal to the fore/aft direction in a plan view. A right side and a left side in the lateral direction in facing front are defined as a right direction and a left direction, respectively. An upward/downward direction of wheel loader 10 is a direction orthogonal to the plane defined by the fore/aft direction and the lateral direction. A side in the upward/downward direction where the ground is located is defined as a lower side and a side where the sky is located is defined as an upper side.

Front frame 12 and rear frame 14 form a vehicular body frame of an articulated structure. Front frame 12 is provided in front of rear frame 14. Front frame 12 is rotatably connected to rear frame 14 by a central pin (not shown). An axis that extends in the upward/downward direction is defined as a rotation center of front frame 12 with respect to rear frame 14.

Front frame 12 and rear frame 14 are coupled to each other by a steering cylinder (not shown). A pair of left and right steering cylinders is provided. As the steering cylinder is driven to extend and contract, front frame 12 rotates laterally around the central pin.

Front wheel 27 and rear wheel 28 are running wheels of wheel loader 10. Front wheel 27 is provided in front frame 12. A pair of left and right front wheels 27 is provided. Rear wheel 28 is provided in rear frame 14. A pair of left and right rear wheels 28 is provided.

Work implement 16 is provided in front frame 12. Work implement 16 includes a boom 21, a bucket 24, a boom cylinder 25, a bell crank 22, a bucket cylinder 26, and a link 23.

Cab 30 and engine hood 17 are provided in rear frame 14. Cab 30 is provided in the rear of work implement 16. Engine hood 17 is provided in the rear of cab 30. Engine hood 17 accommodates a hydraulic oil tank, an engine, a hydraulic pump, an air cleaner, and the like.

Cab 30 delimits an indoor space which an operator enters. A door 32 is provided in a side surface of cab 30. Door 32 is opened and closed when the operator enters or goes out of cab 30. Operator's seat 41 is provided in the indoor space delimited by cab 30. The operator sits in operator's seat 41 in cab 30 and performs an operation to travel wheel loader 10 and operates work implement 16.

[Construction of Inside of Cab 30]

Figure 2:
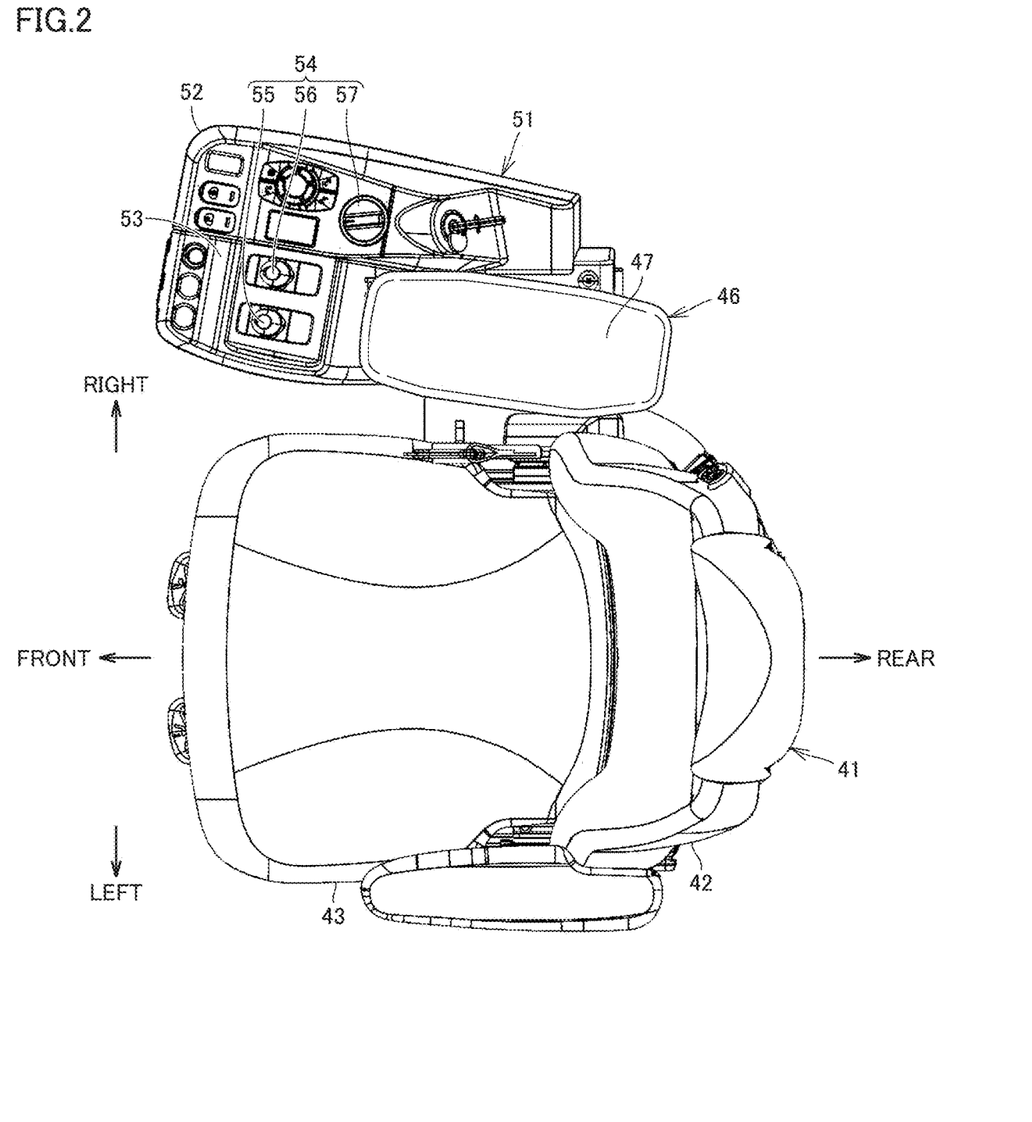
FIG. 2 is a plan view showing a construction around an operator's seat in a cab 30 shown in FIG. 1.

FIG. 2 is a plan view showing a construction around the operator's seat in cab 30 shown in FIG. 1. As shown in FIG. 2, operator's seat 41 includes a seat cushion 43 and a seat back 42. Seat cushion 43 is a seat part in which an operator sits down. Seat back 42 is provided to rise upward from a rear end of seat cushion 43. Seat back 42 is a seat part serving as a backrest for an operator.

A steering wheel, an accelerator pedal, a brake pedal, and a monitor (none of which is shown) are provided in front of operator's seat 41 in cab 30. An armrest 46 and a console 51 are arranged on a right side of operator's seat 41 in cab 30.

Console 51 includes a housing portion 52. Housing portion 52 is in a shape of a housing and defines an appearance of console 51. Housing portion 52 and seat cushion 43 are laterally aligned. Housing portion 52 is aligned at a distance from seat cushion 43 in the lateral direction.

Housing portion 52 includes an upper surface 53. An operation portion 54 is provided on upper surface 53. The operator controls an operation by wheel loader 10, more specifically, travel of wheel loader 10 and an operation by work implement 16, by operating operation portion 54. Operation portion 54 includes control levers 55 and 56 operated for controlling an operation by work implement 16 (boom 21 and bucket 24) and a dial apparatus 57 operated for controlling travel of wheel loader 10.

Control levers 55 and 56 are provided as being slidable in the fore/aft direction. Dial apparatus 57 is provided to be turned. Dial apparatus 57 is arranged as being more distant from operator's seat 41 than control levers 55 and 56. Dial apparatus 57 is arranged in the rear of control levers 55 and 56.

Armrest 46 is used as a support for an operator's elbow. Armrest 46 is arranged above upper surface 53 of console 51. Armrest 46 includes an upper surface 47. Upper surface 47 serves as an elbow support surface on which the elbow of the operator is placed.

[Construction of Dial Apparatus 57]

Figure 3:
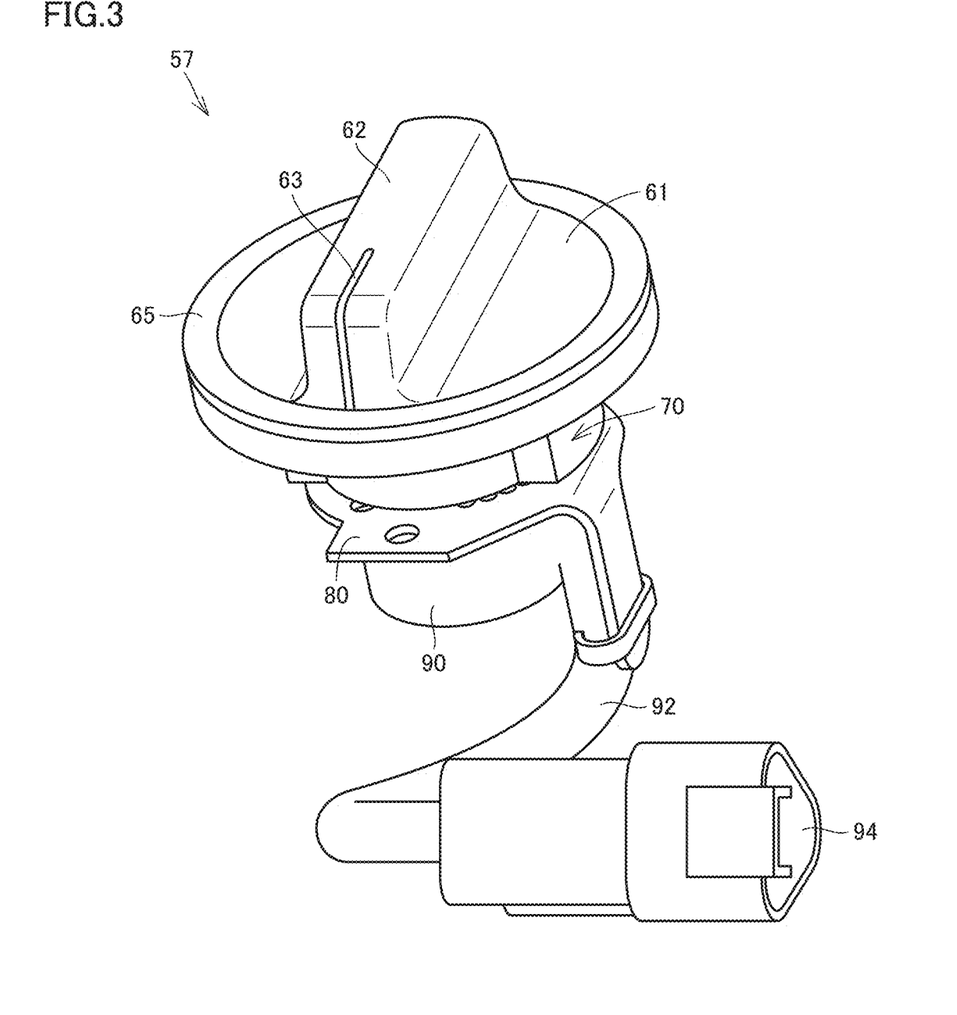
FIG. 3 is a perspective view of a dial apparatus 57.
Figure 4:
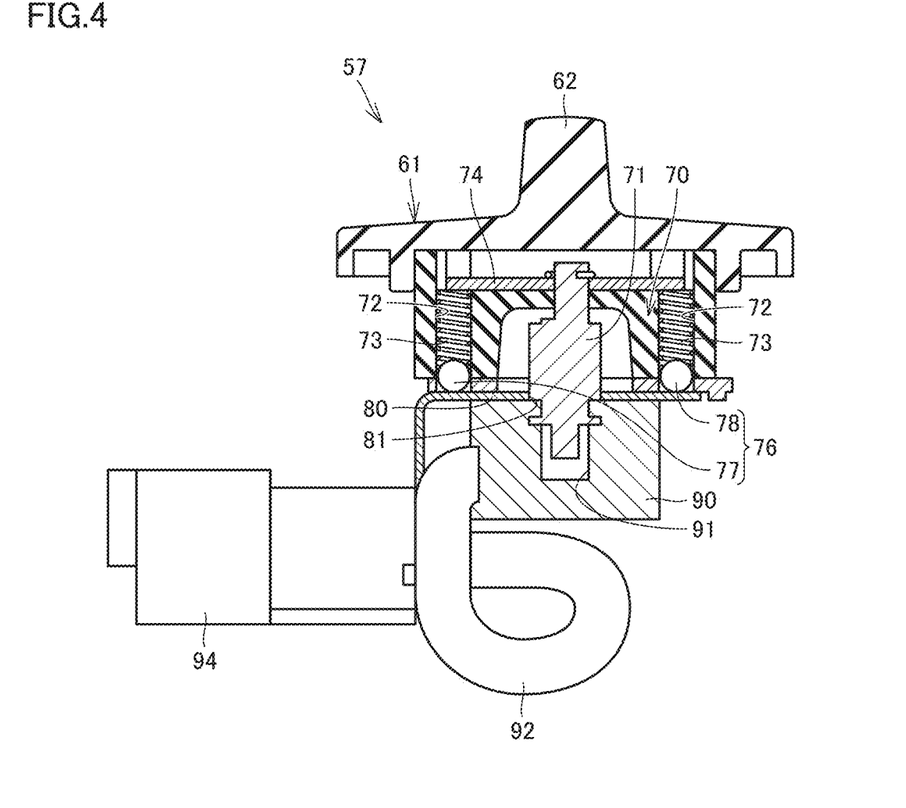
FIG. 4 is a partial cross-sectional view of dial apparatus 57.

Details of a construction of dial apparatus 57 representing an exemplary operation apparatus based on the embodiment will then be described. FIG. 3 is a perspective view of dial apparatus 57. FIG. 4 is a partial cross-sectional view of dial apparatus 57.

As shown in FIGS. 3 and 4, dial apparatus 57 includes a dial main body 61. Dial main body 61 is formed substantially circularly in a plan view. Dial main body 61 is surrounded by an annular attachment ring portion 65. Attachment ring portion 65 is fixed to console 51. Dial main body 61 is turnable with respect to attachment ring portion 65 within a certain range of angles in two directions. Dial main body 61 is turnable relatively to console 51.

An operation knob 62 is formed integrally with dial main body 61. Operation knob 62 is in a shape like a ridge that rises upward from dial main body 61 and extends over the entire diameter of substantially circular dial main body 61. The operator rotationally operates dial apparatus 57 by turning operation knob 62 by holding operation knob 62 with his/her fingers, for example, between his/her thumb and forefinger.

A reference mark 63 is provided at one end of operation knob 62. Reference mark 63 indicates a position in a direction of turning of operation knob 62. Reference mark 63 indicates an adjustment position of dial main body 61 with respect to console 51. An adjustment amount indicator indicating an amount of adjustment corresponding to an adjustment position of dial main body 61 may be formed in attachment ring portion 65 or console 51.

A rotational operation portion 70 is provided below dial main body 61. Rotational operation portion 70 is attached to dial main body 61 and rotates together with dial main body 61 when dial main body 61 is turned. Rotational operation portion 70 is rotatable relatively to console 51. Rotational operation portion 70 includes a spring portion 73, a pressing portion 74, and a contact portion 76.

A shaft portion 71 extends downward from dial main body 61. Shaft portion 71 is arranged concentrically with a rotation center of dial main body 61. Shaft portion 71 is attached to the rotation center of dial main body 61.

A guide cylinder 72 that extends in the upward/downward direction is formed in rotational operation portion 70. Guide cylinder 72 is hollow and cylindrical, and provided at at least one location in rotational operation portion 70. In rotational operation portion 70 shown in FIG. 4, guide cylinder 72 is formed at two locations at positions in point symmetry with respect to the rotation center of dial main body 61.

Spring portion 73 and contact portion 76 are accommodated in each guide cylinder 72. Spring portion 73 is a coil spring, and compressible and extendible in the upward/downward direction which is a direction of extension of guide cylinder 72. Pressing portion 74 is arranged at an upper end of guide cylinder 72. An upper end of spring portion 73 abuts on pressing portion 74. A lower end of spring portion 73 abuts on contact portion 76. Contact portion 76 is movable in the upward/downward direction with compression and extension of spring portion 73. Pressing portion 74 is immovable in the upward/downward direction.

Contact portion 76 includes a first ball 77 accommodated in one of guide cylinders 72 at the two locations and a second ball 78 accommodated in the other of guide cylinders 72 at the two locations. First ball 77 and second ball 78 are spherical. First ball 77 and second ball 78 are equal to each other in diameter. First ball 77 and second ball 78 are identical to each other in shape.

A base 80 is provided below rotational operation portion 70. Rotational operation portion 70 is arranged between dial main body 61 and base 80. Contact portion 76 is in contact with an upper surface of base 80. Spring portion 73 applies downward biasing force to contact portion 76. Spring portion 73 applies to contact portion 76, biasing force in a direction in which contact portion 76 is brought in contact with base 80. Spring portion 73 corresponds to the biasing portion in the embodiment.

Unlike dial main body 61 and rotational operation portion 70, base 80 is unable to rotate relatively to console 51. As the operator operates dial main body 61, dial main body 61 and rotational operation portion 70 rotate relatively to console 51, and at this time, contact portion 76 moves relatively to base 80. Contact portion 76 slides with respect to base 80 as relatively rubbing the base, while it maintains contact with base 80. The operation member in the embodiment that moves contact portion 76 relatively to base 80 upon accepting an input operation is constructed of dial main body 61 operated by the operator and shaft portion 71 serving as a rotation center shaft of dial main body 61 and rotational operation portion 70.

An insertion hole 81 is provided in base 80. Insertion hole 81 passes through base 80 in a direction of thickness. Shaft portion 71 is inserted in insertion hole 81. Shaft portion 71 is arranged to pass through insertion hole 81.

A potentiometer 90 is attached to a lower surface of base 80. A shaft hole 91 is provided in potentiometer 90. Shaft hole 91 communicates with insertion hole 81 in base 80. Potentiometer 90 is positioned with respect to base 80 such that shaft hole 91 is concentric with insertion hole 81. Shaft portion 71 is inserted in shaft hole 91. Shaft portion 71 has a lower end arranged in shaft hole 91.

Potentiometer 90 converts an amount of relative displacement of shaft portion 71 into an electrical signal. Potentiometer 90 converts an angle of rotation of shaft portion 71, that is, an angle of rotation of dial main body 61 and rotational operation portion 70, into an electrical signal. Potentiometer 90 detects the angle of rotation of dial main body 61 and rotational operation portion 70 and provides a voltage corresponding to the angle of rotation.

Potentiometer 90 accepts an input operation and provides a voltage corresponding to a rotation angle representing an operation command in conformity with change of positions of dial main body 61 and rotational operation portion 70 relative to base 80. When there is no input operation accepted, the positions of dial main body 61 and rotational operation portion 70 relative to base 80 are maintained. Since potentiometer 90 does not change the positions of dial main body 61 and rotational operation portion 70 relative to base 80 in this case, it does not change the voltage corresponding to the rotation angle representing the operation command.

One end of a cable 92 is connected to potentiometer 90. The other end of cable 92 is connected to a terminal 94. Potentiometer 90 and terminal 94 are electrically connected to each other through cable 92. An electrical signal corresponding to an angle of rotation detected by potentiometer 90 is provided to the outside through terminal 94.

Base 80 corresponds to the base member in the present invention, potentiometer 90 corresponds to the operational input portion in the present invention, and rotational operation portion 70 corresponds to the operational force providing portion in the present invention.

A dial operation is described by way of example in connection with the operational input portion in the present example. Without being particularly limited to the dial operation, for example, a slide switch that is slidably operated is also similarly applicable.

[Construction of Base 80]

Figure 5:
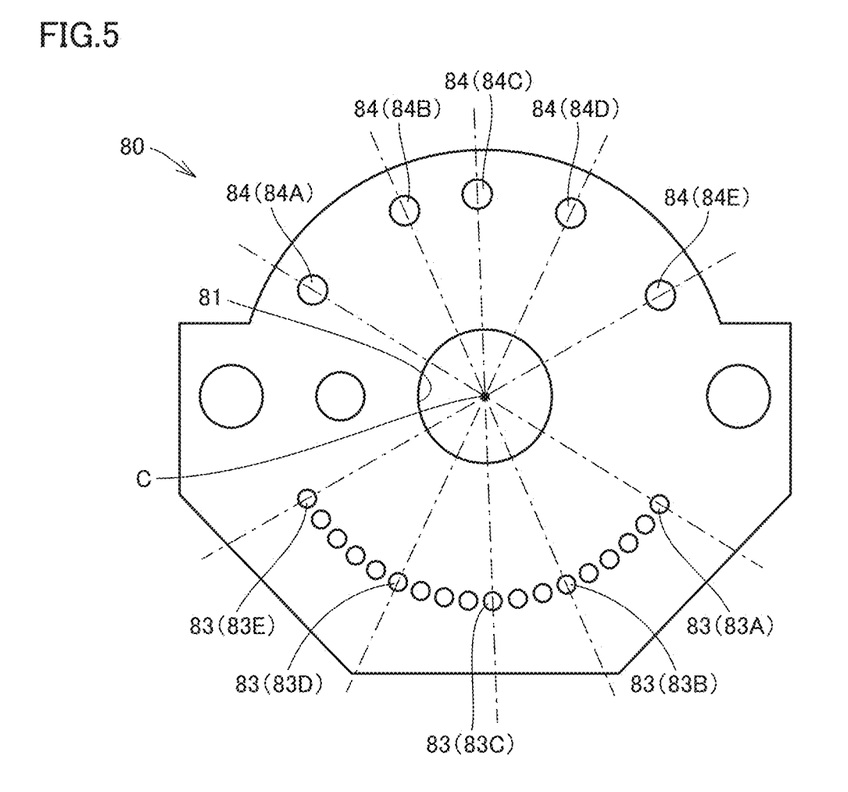
FIG. 5 is a plan view of a base 80.

FIG. 5 is a plan view of base 80. In base 80, a first hole 83 and a second hole 84 in addition to insertion hole 81 described with reference to FIG. 4 are provided.

First hole 83 and second hole 84 are each in a circular shape in a plan view. Second hole 84 is different in diameter from first hole 83. Second hole 84 is larger in diameter than first hole 83. Second hole 84 is provided as being larger in diameter than first hole 83. Second hole 84 is different in dimension from first hole 83.

A plurality of first holes 83 are provided. In the example shown in FIG. 5, eighteen first holes 83 are provided in base 80. A plurality of second holes 84 are provided. In the example shown in FIG. 5, five second holes 84 are provided in base 80. First holes 83 larger in number than second holes 84 are provided.

The plurality of first holes 83 are arranged as being aligned. The plurality of second holes 84 are arranged as being aligned at positions different from positions of first holes 83. First holes 83 and second holes 84 are arranged with insertion hole 81 lying therebetween.

A center C shown in FIG. 5 indicates the center of insertion hole 81. The plurality of first holes 83 are arranged as being aligned along an arc around center C. The plurality of second holes 84 are arranged as being aligned along an arc around center C. The plurality of first holes 83 and the plurality of second holes 84 are arranged as being aligned on an identical circle around center C.

The plurality of first holes 83 are arranged at regular intervals. The plurality of second holes 84 are arranged at irregular intervals. An interval at which two adjacent first holes 83 are arranged is different from an interval at which two adjacent second holes 84 are arranged. The plurality of first holes 83 are all equal in distance between centers. The plurality of second holes 84 are not all equal in distance between centers but includes at least one second hole 84 different in distance between centers.

Five chain dotted lines shown in FIG. 5 indicate straight lines that pass through centers of five second holes 84 and center C representing the center of insertion hole 81. A chain dotted line that passes through the center of a second hole 84A passes through the center of a first hole 83A. A chain dotted line that passes through the center of a second hole 84B passes through the center of a first hole 83B. A chain dotted line that passes through the center of a second hole 84C passes through the center of a first hole 83C. A chain dotted line that passes through the center of a second hole 84D passes through the center of a first hole 83D. A chain dotted line that passes through the center of a second hole 84E passes through the center of a first hole 83E.

Four first holes 83 are provided between first hole 83A and first hole 83B. Two first holes 83 are provided between first hole 83B and first hole 83C. Three first holes 83 are provided between first hole 83C and first hole 83D. Four first holes 83 are provided between first hole 83D and first hole 83E.

Therefore, an interval between second hole 84A and second hole 84B is larger than an interval between second hole 84B and second hole 84C. An interval between second hole 84C and second hole 84D is smaller than the interval between second hole 84A and second hole 84B and larger than the interval between second hole 84B and second hole 84C. An interval between second hole 84D and second hole 84E is equal to the interval between second hole 84A and second hole 84B. Second holes 84 are thus arranged at irregular intervals.

Figure 6:
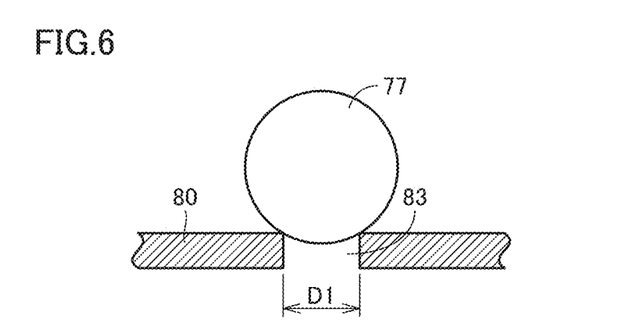
FIG. 6 is a schematic diagram showing engagement of a first ball 77 with a first hole 83.
Figure 7:
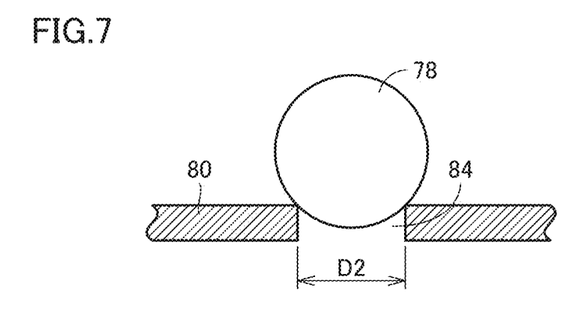
FIG. 7 is a schematic diagram showing engagement of a second ball 78 with a second hole 84.

FIG. 6 is a schematic diagram showing engagement of first ball 77 with first hole 83. FIG. 7 is a schematic diagram showing engagement of second ball 78 with second hole 84. First ball 77 can selectively be engaged with any one of the plurality of first holes 83. Second ball 78 can selectively be engaged with any one of the plurality of second holes 84. First hole 83 corresponds to the first engagement portion in the embodiment. Second hole 84 corresponds to the second engagement portion in the embodiment.

A diameter D1 shown in FIG. 6 represents a diameter of first hole 83. A diameter D2 shown in FIG. 7 represents a diameter of second hole 84. Diameter D1 corresponds to the first dimension in the embodiment. Diameter D2 corresponds to the second dimension in the embodiment.

Diameter D2 of second hole 84 is larger than diameter D1 of first hole 83. A depth of entry of second ball 78 into second hole 84 in engagement of second ball 78 with second hole 84 is larger than a depth of entry of first ball 77 into first hole 83 in engagement of first ball 77 with first hole 83. Force necessary for getting second ball 78 out of second hole 84 and disengaging second ball 78 from second hole 84 is larger than force necessary for getting first ball 77 out of first hole 83 and disengaging first ball 77 from first hole 83.

As described with reference to FIG. 4, guide cylinders 72 at two locations are formed at positions in point symmetry with respect to the rotation center of dial main body 61. First ball 77 accommodated in one of guide cylinders 72 at the two locations and second ball 78 accommodated in the other of guide cylinders 72 at the two locations are arranged at positions in point symmetry with respect to the rotation center of dial main body 61.

Referring also to FIG. 5, in rotational movement of first ball 77 and second ball 78 relative to base 80 around center C, there are a case in which first ball 77 is engaged with first hole 83 and second ball 78 is engaged with second hole 84 and a case in which first ball 77 is engaged with first hole 83 but second ball 78 is not engaged with second hole 84. For example, when first ball 77 is engaged with first hole 83A, second ball 78 is engaged with second hole 84A. When first ball 77 moves to be engaged with first hole 83 adjacent to first hole 83A, second ball 78 is located between second hole 84A and second hole 84B and it is engaged with none of second holes 84.

When second ball 78 is not engaged with second hole 84, torque necessary for turning dial main body 61 should only be large enough to get first ball 77 out of first hole 83. When second ball 78 is engaged with second hole 84, torque necessary for turning dial main body 61 is required to be large enough to get second ball 78 out of second hole 84.

With a relatively strong click feel produced when second ball 78 fits in second hole 84, the operator who operates dial main body 61 can recognize engagement of second ball 78 with any of second holes 84. The operator can recognize, also based on relatively large operating force required for disengaging second ball 78 from second hole 84, engagement of second ball 78 with any of second holes 84. With a relatively light click feel and turning of dial main body 61 with relatively small operating force, the operator can recognize that second ball 78 is not engaged with second hole 84 but first ball 77 is engaged with first hole 83.

Thus, the operator who operates dial main body 61 can be given a plurality of operational feelings different between the case in which first ball 77 is engaged with first hole 83 but second ball 78 is not engaged with second hole 84 and the case in which first ball 77 is engaged with first hole 83 and second ball 78 is engaged with second hole 84. Therefore, a feeling at the time of operation of dial apparatus 57 can appropriately be given to the operator. The operator can perceive whether or not second ball 78 is engaged with second hole 84 based on his/her feeling at fingertips, without looking at dial apparatus 57.

When first holes 83 and second holes 84 different in dimension are aligned in a random order, a distance between circumferences of holes is different between a portion where two first holes 83 are adjacent to each other and a portion where first hole 83 and second hole 84 are adjacent to each other. Since first holes 83 and second holes 84 are arranged at different positions in base 80 in the embodiment, the plurality of first holes 83 can be provided at regular intervals. The interval between first holes 83 can thus be made smaller in consideration of limit of accuracy in machining.

Since the plurality of first holes 83 and the plurality of second holes 84 are arranged with insertion hole 81 lying therebetween, balance in base 80 where first holes 83 and second holes 84 are provided can be improved.

Since first holes 83 and second holes 84 are arranged as being aligned along the arc around center C, contact portion 76 that moves along an arc trace as dial main body 61 is operated can reliably selectively be engaged with any one of the plurality of first holes 83 and the plurality of second holes 84.

Figure 8:
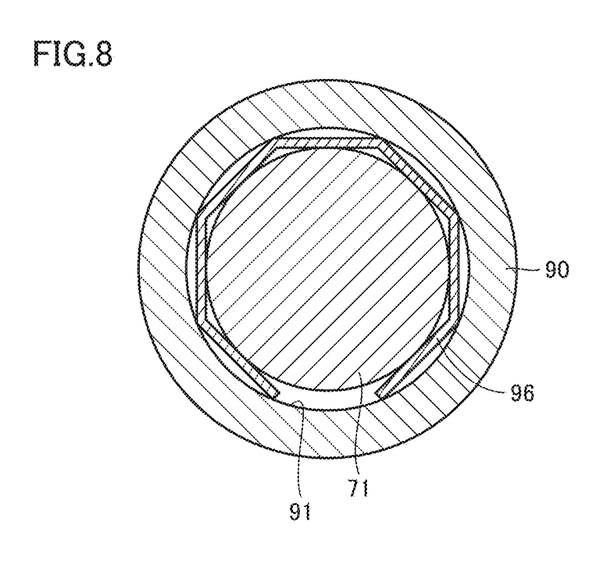
FIG. 8 is a cross-sectional view showing a construction of a resistance providing portion.

FIG. 8 is a cross-sectional view showing a construction of a resistance providing portion. FIG. 8 shows a cross-section of potentiometer 90 and shaft portion 71 inserted in shaft hole 91 in potentiometer 90. As shown in FIG. 8, a leaf spring 96 is interposed between potentiometer 90 and shaft portion 71. Leaf spring 96 is formed from an elastic thin metal plate bent into a polygonal shape. Leaf spring 96 is held in a bent state, with a center of each side being pressed radially outward by an outer circumferential surface of shaft portion 71.

When shaft portion 71 rotates relatively to potentiometer 90, friction force is produced between leaf spring 96 and shaft portion 71. This friction force increases resistance against rotation of shaft portion 71. Leaf spring 96 corresponds to the resistance providing portion in the embodiment.

According to such a construction including the resistance providing portion, movement relative to base 80 due to slip of first ball 77 while first ball 77 is not engaged with first hole 83 is suppressed. Thus, movement of first ball 77 beyond adjacent first hole 83 due to momentum at the time when first ball 77 moves to adjacent first hole 83 by an operation to turn dial main body 61 by the operator is suppressed. As a state that first ball 77 is in first hole 83 is stabilized, first ball 77 can more reliably be engaged with any one of the plurality of first holes 83.

A vehicle speed restriction dial is described by way of example of the operation apparatus in the description of the embodiment above. Without being limited to the vehicle speed restriction dial, the operation apparatus in the present disclosure may be applied to a dial apparatus of another type such as a dial indicating a torque restriction value or a fuel dial for setting the number of revolutions of the engine.

Though first hole 83 and second hole 84 provided in base 80 are defined as the first engagement portion and the second engagement portion in the embodiment, the first engagement portion and the second engagement portion are not limited to holes. Protrusions formed on the upper surface of base 80 may be defined as the first engagement portion and the second engagement portion.

The operation apparatus is not limited to the dial. For example, the operation apparatus may include an operational input portion that can slidably be operated. In this case, such a construction that the first engagement portions and the second engagement portions are each arranged as being aligned on a straight line instead of the arc and a slidably movable contact portion can relatively be engaged with any one of the first engagement portions and the second engagement portions can be realized.

A row of aligned first engagement portions and a row of aligned second engagement portions may extend in parallel. The row of aligned first engagement portions and the row of aligned second engagement portions may be provided on an identical line. The second engagement portions may be included in the row of aligned first engagement portions.

Figure 9:
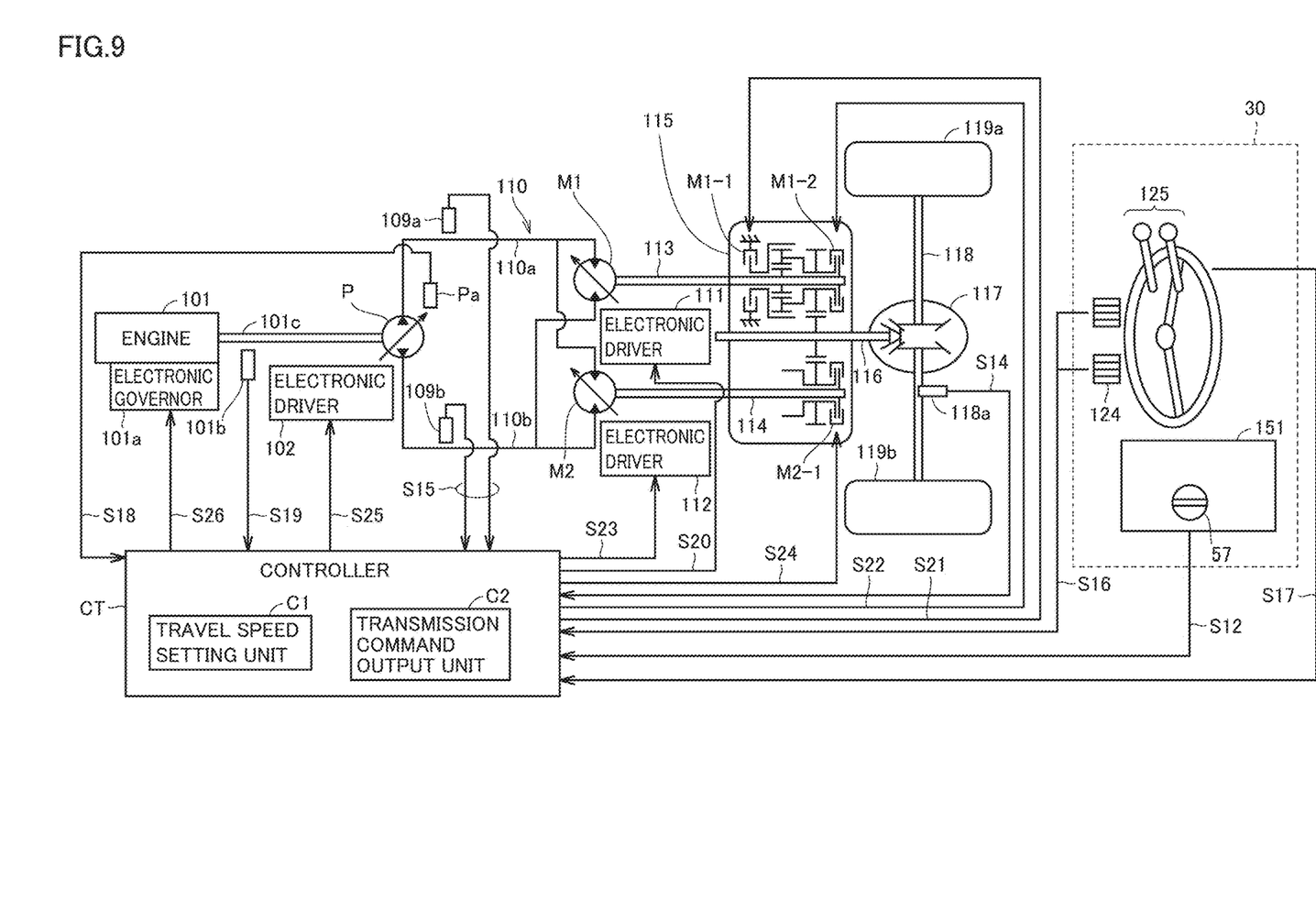
FIG. 9 is a diagram illustrating a configuration of a work machine control system including a travel control device based on the embodiment.

FIG. 9 is a diagram illustrating a configuration of a work machine control system including a travel control device based on the embodiment.

FIG. 9 shows use of a hydraulic drive apparatus referred to as what is called a hydraulic static transmission (HST) by way of example of a travel control device. An HST 110 is mounted on a vehicle used as an earthmoving machine such as a wheel loader or a crawler dozer, and includes a hydraulic pump P and hydraulic motors M1 and M2 connected through a hydraulic pressure supply pipe paths 110a and 110b which are closed circuits. Hydraulic pressure supply pipe paths 110a and 110b each include a branch portion and a merge portion therein, and two hydraulic motors M1 and M2 are connected in parallel to one hydraulic pump P.

Hydraulic pump P is driven by an engine 101 of the vehicle and connected thereto with a PTO shaft 101c being interposed. In the embodiment, a variable displacement HST pump displacement of which can be changed by changing a tilting angle of a swash plate is applied.

Hydraulic motors M1 and M2 are driven by pressurized oil delivered from hydraulic pump P. In this embodiment, a variable displacement HST motor displacement of which can be changed by changing a tilting angle of a bent axis is applied.

A transmission mechanism 115 is connected to output motor shafts 113 and 114 of hydraulic motors M1 and M2, and connected to drive wheels 119a and 119b of the vehicle with an output shaft 116 of transmission mechanism 115 as well as a differential gear 117 and an axle shaft 118 being interposed. The vehicle can travel by rotationally driving the drive wheels. A direction of rotation of hydraulic motors M1 and M2 can be switched in accordance with a direction of supply of pressurized oil from hydraulic pump P, so that the vehicle can travel forward or rearward. For example, when pressurized oil delivered from hydraulic pump P is supplied to hydraulic motors M1 and M2 through hydraulic pressure supply pipe path 110a, the vehicle travels forward, and when pressurized oil delivered from hydraulic pump P is supplied to hydraulic motors M1 and M2 through hydraulic pressure supply pipe path 110b, the vehicle travels rearward.

A planetary gear mechanism as one transmission mechanism 115 is provided around output motor shaft 113 of hydraulic motor M1. The planetary gear mechanism includes a sun gear as input and includes a planetary carrier as output. A gear ratio is changed by switching an outer gear to a fixed state (on) and a free state (off) by means of a clutch M1-1. The planetary carrier is meshed with output shaft 116, and transmits torque. The gear ratio refers to the number of rotations of output shaft 116 being made smaller than the number of rotations of hydraulic motors M1 and M2. Output motor shaft 113 includes a clutch M1-2 that couples an output motor shaft and the planetary carrier to each other. Therefore, by setting clutch M1-1 to on and setting clutch M1-2 to off, transmission output in which a planetary gear (output motor shaft 113) serves as input and the planetary carrier serves as output, such as output at a first gear ratio, is obtained. By setting clutch M1-1 to off and setting clutch M1-2 to on, the outer gear is free and the planetary gear mechanism does not function, so that output motor shaft 113 is coupled to the planetary carrier to obtain, for example, output at a second gear ratio. Output motor shaft 114 of hydraulic motor M2 is connected with a clutch M2-1 being interposed, clutch M2-1 coupling a gear meshed with output shaft 116 and output motor shaft 114 to each other. For example, when clutch M2-1 is on, a third gear ratio is set and torque is transmitted at that ratio.

A signal from an electric pedal angle sensor 124 is provided to controller CT. In response to a signal from controller CT, an electronic governor 101a controls an amount of fuel injection into engine 101. Engine 101 is thus controlled to be constant in number of revolutions. The number of revolutions of engine 101 is detected by an engine revolution sensor 101b and provided to controller CT.

Under the control by controller CT, an electronic driver 102 that drives an electromagnetic valve controls an angle of a swash plate, so that displacement of hydraulic pump P is controlled. A swash plate sensor Pa detects the angle of the swash plate. Similarly, electronic drivers 111 and 112 that drive electromagnetic valves control angles of the swash plates of hydraulic motors M1 and M2, respectively, so that displacement of hydraulic motors M1 and M2 is also controlled. Hydraulic pressure sensors 109a and 109b detect main hydraulic pressures in hydraulic pressure supply pipe paths 110a and 110b and controller CT controls prevention of engine stall or prevention of overload.

Cab 30 includes dial apparatus 57, electric pedal angle sensor 124, and an FR lever 125 therein.

Electric pedal angle sensor 124 detects an angle of an electric pedal, provides a value in accordance with the angle to controller CT, and controls the number of revolutions of engine 101. As FR lever 125 is operated, it provides a direction signal indicating forward travel, a neutral state, and a rearward travel of the vehicle to controller CT.

Dial apparatus 57 is a dial with which a maximum vehicle speed point is set during works.

Controller CT receives a dial signal S12 for adjusting a speed indicating a highest speed point from dial apparatus 57, a vehicle speed sensor signal S14 which is a detection signal from a vehicle speed sensor 118a, main hydraulic pressure signals S15 indicating values of main hydraulic pressures detected by hydraulic pressure sensors 109a and 109b, an electric pedal angle sensor signal S16 indicating an angle of the electric pedal, a direction signal provided from FR lever 125, a swash plate sensor signal indicating an angle of the swash plate detected by swash plate sensor Pa, and an engine revolution sensor signal S19 indicating the number of engine revolutions detected by engine revolution sensor 101b.

Controller CT provides motor displacement control signals S20 and S23 for respective electronic drivers 111 and 112 that control the angles of the swash plates of hydraulic motors M1 and M2, clutch switching signals S21, S22, and S24 for controlling on and off of clutches M1-1, M1-2, and M2-1, a pump displacement control signal S25 for electronic driver 102 that controls the angle of the swash plate of hydraulic pump P, and a governor control signal S26 for electronic governor 101a.

Controller CT controls switching of the clutch and control of displacement such that hydraulic motors M1 and M2 can achieve most efficient torque transmission depending on a travel speed.

Controller CT includes a travel speed setting unit C1 and a transmission command output unit C2.

Travel speed setting unit C1 sets a travel speed of drive wheels 119a and 119b based on a speed table in accordance with an operation command signal which is a dial signal from dial apparatus 57.

Transmission command output unit C2 provides a command to adjust the restricted number of rotations of output shaft 116 connected to drive wheels 119a and 119b, based on the travel speed set by travel speed setting unit C1.

Specifically, transmission command output unit C2 controls switching of clutches M1-1, M1-2, and M2-1 in transmission mechanism 115 and controls displacement of hydraulic pump P and hydraulic motors M1 and M2. Switching of the clutch and displacement are controlled based on prescribed switching pattern and displacement control pattern dependent on a travel speed.

Transmission mechanism 115, hydraulic pump P, hydraulic motors M1 and M2, and electronic drivers 102, 111 and 112 represent an exemplary "transmission portion" in the present invention. Travel speed setting unit C1 and transmission command output unit C2 represent an exemplary "travel speed setting unit" and a "transmission command output unit" in the present invention, respectively.

Figure 10:
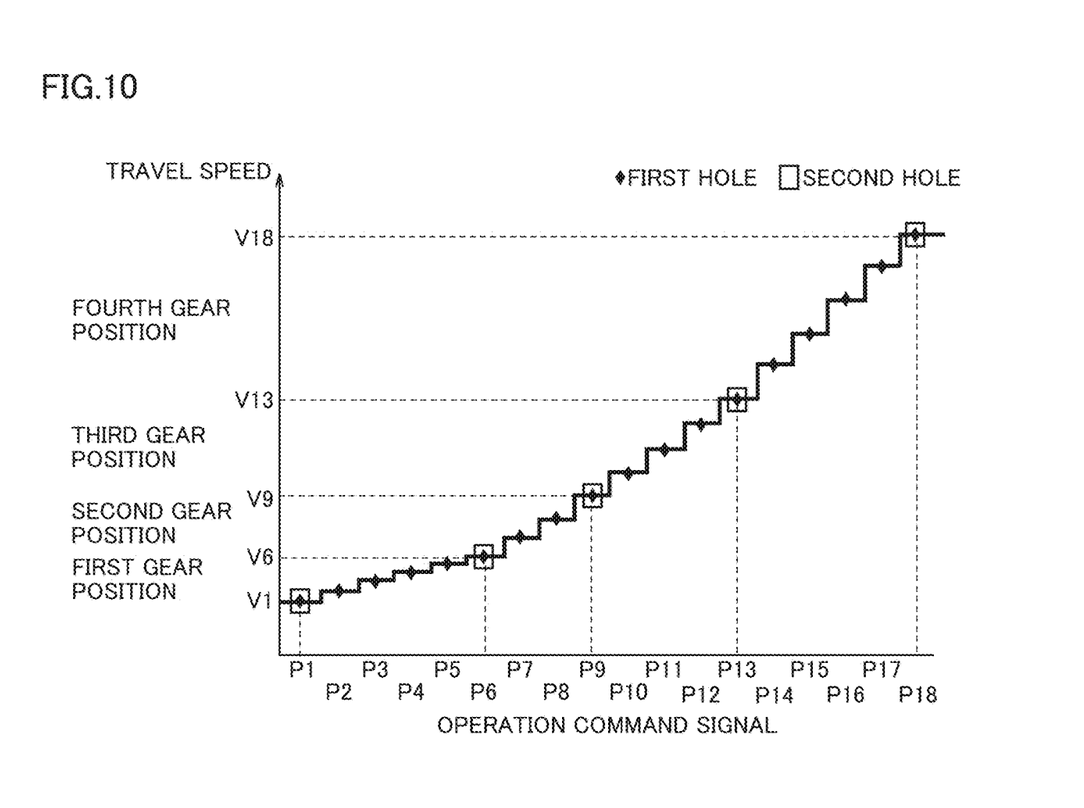
FIG. 10 is a diagram illustrating a speed table for setting a travel speed corresponding to an operation command signal resulting from a dial operation according to the embodiment.

FIG. 10 is a diagram illustrating a speed table for setting a travel speed corresponding to an operation command signal resulting from a dial operation according to the embodiment.

Referring to FIG. 10, the abscissa represents an operation command signal corresponding to an operation position in a dial operation. The ordinate represents a travel speed.

Dial apparatus 57 provides operation command signals P1 to P18 in correspondence with first to eighteenth operation positions in a dial operation. With change of the operation position, change of the operation command signal is also constant.

Travel speed setting unit C1 sets travel speeds V1 to V18 corresponding to respective operation command signals P1 to P18 based on the speed table.

A region of the travel speed is broadly divided into four gear positions. By way of example, a first gear position and a second gear position of the four gear positions are defined as gear positions in a region low in travel speed and a third gear position and a fourth gear position are defined as gear positions in a region high in travel speed.

An amount of variation in travel speed with respect to an amount of change of the operation position is set to be larger in the region high in travel speed than in the region low in travel speed. Therefore, the amount of variation in travel speed with respect to the amount of change of the operation position in the third gear position and the fourth gear position is larger than the amount of variation in travel speed with respect to the amount of change of the operation position in the first gear position and the second gear position.

Each gear position is divided stepwise into a plurality of speed sections. The travel speed in each speed section is constant. Specifically, the first gear position is divided into six speed sections. In the first gear position, travel speed setting unit C1 sets the travel speed to travel speeds V1 to V6 representing the six speed sections in response to operation command signals P1 to P6, respectively. The second gear position is divided into three speed sections. In the second gear position, travel speed setting unit C1 sets the travel speed to travel speeds V7 to V9 representing the three speed sections in response to operation command signals P7 to P9, respectively. The third gear position is divided into four speed sections. In the third gear position, travel speed setting unit C1 sets the travel speed to travel speeds V10 to V13 representing the four speed sections in response to operation command signals P10 to P13, respectively. The fourth gear position is divided into five speed sections. Travel speed setting unit C1 sets the travel speed to travel speeds V14 to V18 representing the five speed sections in response to operation command signals P14 to P18, respectively.

Eighteen travel sections in accordance with the speed table are provided, and travel speed setting unit C1 can set the travel speed in eighteen stages. The travel speed in each travel section is constant. Therefore, the travel speed in a certain section does not vary with change in operation command signal.

Relation between the operation position of dial apparatus 57 and setting of the travel speed will now be described.

Dial apparatus 57 includes eighteen dial operation positions corresponding to positions where an operational feeling is obtained as a result of engagement of first ball 77 with first hole 83 in operating dial main body 61.

Operation command signals P1 to P18 are associated with positions where eighteen first holes 83 in base 80 shown in FIG. 5 are provided.

Rhombic plots in the speed table in FIG. 10 mean that eighteen first holes 83 shown in FIG. 5 are provided at first to eighteenth operation positions. Hollow rectangular plots mean that five second holes 84 are provided at the operation positions. Second holes 84 are provided at first, sixth, ninth, thirteenth, and eighteenth operation positions among the first to eighteenth operation positions. The first, sixth, ninth, thirteenth, and eighteenth operation positions correspond to positions where different operational feelings are obtained as a result of engagement of second ball 78 with second hole 84 when dial main body 61 is operated.

In the present example, controller CT controls clutch switching for changing the gear position in accordance with the operation command signal corresponding to the operation position where second hole 84 is provided. Specifically, the gear position is changed in correspondence with each of the sixth, ninth, thirteenth, and eighteenth operation positions.

The operator can perceive based on his/her feeling at the fingertips in which of the first gear position, second gear position, third gear position, and fourth gear position the maximum vehicle speed has been set with the use of the vehicle speed restriction dial, without looking at dial apparatus 57. In addition, by changing setting as to with which of first holes 83 first ball 77 is to be engaged, the maximum vehicle speed can more finely be set at each gear position. In setting of each speed section in the first gear position, vehicle speed setting in six stages corresponding to the first to sixth operation positions can be made. Therefore, the vehicle speed in a case in which a low maximum vehicle speed is defined such as travel of wheel loader 10 on a mud ground or snow removal works by wheel loader 10 can precisely be set.

Therefore, an operational feeling in a case of the relatively large amount of change in setting from the first gear position to the second gear position, from the second gear position to the third gear position, and from the third gear position to the fourth gear position in response to an input operation onto dial apparatus 57 is different from an operational feeling in a case of the relatively small amount of change in finely setting a vehicle speed in each speed section, and hence the travel speed can readily be set.

Relation between an operation position of dial apparatus 57 and transmission mechanism 115 will now be described.

Travel speed setting unit C1 accepts operation command signal P6 in accordance with the sixth operation position indicated by the dial operation and sets the travel speed to travel speed V6. Transmission command output unit C2 sets the gear position to the first gear position in accordance with setting to travel speed V6 by travel speed setting unit C1. Transmission command output unit C2 sets the gear position to the first gear position by setting clutch M1-1 to on, setting clutch M1-2 to off, and setting clutch M2-1 to on.

Transmission command output unit C2 provides a command to adjust the restricted number of rotations of output shaft 116 connected to drive wheels 119a and 119b so as to set the travel speed to travel speeds V1 to V6 set by travel speed setting unit C1 in correspondence with the first to sixth operation positions, under displacement control of hydraulic pump P and hydraulic motors M1 and M2.

Travel speed setting unit C1 accepts operation command signal P9 in accordance with the ninth operation position indicated by the dial operation and sets the travel speed to travel speed V9. Transmission command output unit C2 sets the gear position to the second gear position in accordance with setting to travel speed V9 by travel speed setting unit C1. Transmission command output unit C2 sets the gear position to the second gear position by setting clutch M1-1 to off, clutch M1-2 to off, and a clutch M2-1 to on.

Transmission command output unit C2 provides a command to adjust the restricted number of rotations of output shaft 116 connected to drive wheels 119a and 119b so as to set the travel speed to travel speeds V7 to V9 set by travel speed setting unit C1 in correspondence with the seventh to ninth operation positions under control of displacement of hydraulic pump P and hydraulic motors M1 and M2.

Travel speed setting unit C1 accepts operation command signal P13 in accordance with the thirteenth operation position indicated by the dial operation and sets the travel speed to travel speed V13. Transmission command output unit C2 sets the gear position to the third gear position in accordance with setting to travel speed V13 by travel speed setting unit C1. Transmission command output unit C2 sets the gear position to the third gear position by setting clutch M1-1 to off, clutch M1-2 to on, and clutch M2-1 to off in the third gear position.

Transmission command output unit C2 provides a command to adjust the restricted number of rotations of output shaft 116 connected to drive wheels 119a and 119b so as to set the travel speed to travel speeds V10 to V13 set by travel speed setting unit C1 in correspondence with the tenth to thirteenth operation positions under control of displacement of hydraulic pump P and hydraulic motors M1 and M2.

Travel speed setting unit C1 accepts operation command signal P18 in accordance with the eighteenth operation position indicated by the dial operation and sets the travel speed to travel speed V18. Transmission command output unit C2 sets the gear position to the fourth gear position in accordance with setting to travel speed V18 by travel speed setting unit C1. Transmission command output unit C2 sets clutch M1-1 to on, clutch M1-2 to off, and clutch M2-1 to off in the fourth gear position.

Transmission command output unit C2 provides a command to adjust the restricted number of rotations of output shaft 116 connected to drive wheels 119a and 119b so as to set the travel speed to travel speeds V14 to V18 set by travel speed setting unit C1 in correspondence with the fourteenth to eighteenth operation positions under control of displacement of hydraulic pump P and hydraulic motors M1 and M2.

Travel speed setting unit C1 sets the travel speed to a travel speed in a next gear position of the plurality of gear positions (four gear positions by way of example) provided stepwise, in accordance with the operation command in conformity with change of the position relative to second adjacent hole 84 among the plurality of second holes 84 in accordance with the dial operation. Transmission command output unit C2 controls switching of the clutch in accordance with the gear position set by travel speed setting unit C1.

Travel speed setting unit C1 sets the travel speed to a travel speed in the next speed section among the plurality of divided speed sections in each gear position, in accordance with the operation command in conformity with change of the position relative to first adjacent hole 83 among the plurality of first holes 83 in accordance with the dial operation. Transmission command output unit C2 controls displacement of hydraulic pump P and hydraulic motors M1 and M2 in accordance with the travel speed set by travel speed setting unit C1.

Thus, the hydraulic motor is efficiently controlled in accordance with the vehicle speed, based on clutch switching control and displacement control of the hydraulic motor and the hydraulic pump.

Though clutch switching control in four gear speeds is described in the present example, this clutch switching control is by way of example. Different switching can also be made, and any gear position can be set without being limited to four gear speeds.

In the present example, the first gear position includes five speed sections in a range from travel speeds V1 to V6, the second gear position includes three speed sections in a range from travel speeds V6 to V9, the third gear position includes four speed sections in a range from travel speeds V9 to V13, and the fourth gear position includes five speed sections in a range from travel speeds V13 to V18. The plurality of speed sections in each gear position correspond to the number of times of engagement of first ball 77 with first hole 83 in engagement of second ball 78 with adjacent second hole 84 in response to change in dial operation.

When engagement of second ball 78 with second hole 84A is changed to engagement with adjacent second hole 84B in response to change in dial operation, first ball 77 is sequentially engaged with each of five first holes 83. When engagement of second ball 78 with second hole 84B is changed to engagement with adjacent second hole 84C in response to change in dial operation, first ball 77 is engaged with each of three first holes 83. When engagement of second ball 78 with second hole 84C is changed to engagement with adjacent second hole 84D in response to change in dial operation, first ball 77 is engaged with each of four first holes 83. When engagement of second ball 78 with second hole 84D is changed to engagement with adjacent second hole 84E in response to change in dial operation, first ball 77 is engaged with each of five first holes 83.

Therefore, by changing intervals between adjacent second holes 84 provided in base 80 (changing positions of second holes 84B, 84C, and 84D), the number of times of engagement of first ball 77 with first hole 83 in engagement of second ball 78 with adjacent second hole 84 in response to change in dial operation can also be changed and the number of speed sections in each gear position can be customized to any number.

Though a configuration of the HST is described in the present example by way of example of the travel control device, the present embodiment can be applied to a general continuously variable transmission (CVT) such as a hydraulic mechanical transmission (HMT) and an electromechanical transmission (EMT), without being particularly limited to the HST.

An example in which operational force in operating dial main body 61 is mechanically changed based on combination of engagement operations for engaging first ball 77 with first hole 83 and engaging second ball 78 with second hole 84 is described in the present embodiment. Without being particularly limited as such, operational force can also electrically be changed. Specifically, operation resistance in operating dial main body 61 may be adjusted in accordance with an electrical signal from the controller.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

10 wheel loader; 12 front frame; 14 rear frame; 16 work implement; 17 engine hood; 21 boom; 22 bell crank; 23 link; 24 bucket; 25 boom cylinder; 26 bucket cylinder; 27 front wheel; 28 rear wheel; 30 cab; 32 door; 41 operator's seat; 42 seat back; 43 seat cushion; 46 armrest; 47, 53 upper surface; 51 console; 52 housing portion; 54 operation portion; 55, 56 control lever; 57 dial apparatus; 61 dial main body; 62 operation knob; 63 reference mark; 65 attachment ring portion; 70 rotational operation portion; 71 shaft portion; 72 guide cylinder; 73 spring portion; 74 pressing portion; 76 contact portion; 77 first ball; 78 second ball; 80 base; 81 insertion hole; 83 first hole; 84 second hole; 90 potentiometer; 91 shaft hole; 92 cable; 94 terminal; 96 leaf spring; 101 engine; 101*b* engine revolution sensor; 101*c* PTO shaft; 102, 111, 112 electronic driver; 109*a*, 109*b* hydraulic pressure sensor; 110*a*, 110*b* hydraulic pressure supply pipe path; 113, 114 output motor shaft; 115 transmission mechanism; 116 output shaft; 117 differential gear; 118 axle shaft; 118*a* vehicle speed sensor; 119*a*, 119*b* drive wheel; 124 electric pedal angle sensor; 125 FR lever; C1 travel speed setting unit; C2 transmission command output unit; CT controller

The invention claimed is:

1. A work machine control system comprising:
   a base member;
   an operation member operably attached to the base member, the operation member accepting an input operation to change a position relative to the base member, the operation member maintaining the relative position when there is no input operation accepted;
   an operational input portion that provides an operation command in accordance with the position of the operation member relative to the base member;
   an operational force providing portion that provides a plurality of different operational forces in correspondence with change of the relative position;
   a transmission portion that changes a speed of rotation provided from a drive source and transmits resultant rotation to a drive wheel; and
   a controller that instructs the transmission portion to change the speed of rotation in accordance with the operation command.

2. The work machine control system according to claim 1, wherein the controller includes
   a travel speed setting unit that sets a travel speed of the drive wheel in accordance with the operation command, and
   a transmission command output unit that provides a command to adjust a restricted number of rotations of a vehicle output shaft connected to the drive wheel, based on the travel speed set by the travel speed setting unit.

3. The work machine control system according to claim 1, wherein
   the travel speed setting unit sets a travel speed of the drive wheel stepwise, in accordance with the operation command.

4. The work machine control system according to claim 3, wherein
   the travel speed setting unit sets the travel speed such that an amount of stepwise variation in travel speed of the drive wheel is larger in a region high in travel speed of the drive wheel than in a region low in travel speed of the drive wheel.

5. The work machine control system according to claim 1, wherein the base member includes
   a plurality of first engagement portions each having a first dimension, and
   a plurality of second engagement portions each having a second dimension different from the first dimension, and
   the operational force providing portion includes
   a contact portion in contact with the base member, the contact portion being provided as being movable relatively to the base member and being selectively engaged with any one of the plurality of first engagement portions and the plurality of second engagement portions, and
   a biasing portion that applies to the contact portion, biasing force in a direction in which the contact portion is brought in contact with the base member.

6. The work machine control system according to claim 4, wherein
   a region of the travel speed of the drive wheel is divided into a plurality of gear positions,
   the gear positions are divided into a gear position in a region higher in travel speed of the drive wheel and a gear position in a region lower in travel speed, and
   the controller instructs the transmission portion to change the speed of rotation so as to set a travel speed in one gear position among the plurality of gear positions, in accordance with the operation command.

7. The work machine control system according to claim 6, wherein
   each of the gear positions is divided into a plurality of speed sections, and
   the controller instructs the transmission portion to change the speed of rotation so as to set a travel speed in one speed section of the plurality of divided speed sections in each gear position, in accordance with the operation command.

8. The work machine control system according to claim 5, wherein
   the operation member includes a dial that is turned and a shaft portion attached to a rotation center of the dial,
   the base member is provided with an insertion hole in which the shaft portion is inserted, and
   the plurality of first engagement portions and the plurality of second engagement portions are arranged with the insertion hole lying therebetween.

9. The work machine control system according to claim 5, wherein
   the controller instructs the transmission portion to change the speed of rotation so as to set a travel speed in a next gear position among the plurality of gear positions provided stepwise, in accordance with the operation command in conformity with change of the position relative to an adjacent first engagement portion among the plurality of first engagement portions.

10. The work machine control system according to claim 9, wherein
the controller instructs the transmission portion to change the speed of rotation so as to set a travel speed in a next speed section among the plurality of divided speed sections in each gear position, in accordance with the operation command in conformity with change of the position relative to an adjacent second engagement portion among the plurality of second engagement portions.

* * * * *